(No Model.)

F. B. STEVENS.
Piston Packing.

No. 235,971.  Patented Dec. 28, 1880.

Witnesses
F. Angeltinger
Alexander Stevens

Inventor
Francis B. Stevens

UNITED STATES PATENT OFFICE.

FRANCIS B. STEVENS, OF HOBOKEN, NEW JERSEY.

PISTON-PACKING.

SPECIFICATION forming part of Letters Patent No. 235,971, dated December 28, 1880.

Application filed April 28, 1880. (No model.)

*To all whom it may concern:*

Be it known that I, FRANCIS B. STEVENS, a citizen of the United States, residing at the city of Hoboken, in the county of Hudson and State of New Jersey, have invented a new and useful Improvement in Piston-Packings, of which the following is a specification.

My improvement relates to the well-known piston-packing commonly called the "Ramsbottom" piston-packing, consisting of a solid piston without follower fitted to the bore of the cylinder, and having a number of narrow grooves or recesses made on the part in contact with the cylinder, into each of which grooves a steel wire or other narrow packing-ring is placed, these narrow packing-rings having sufficient elasticity to admit of their being sprung or stretched over the outer diameter of the piston, so as to go into the grooves, and also when there to press against the bore of the cylinder to prevent the passage of the steam.

My improvement consists in constructing this piston so that the packing-rings need not be stretched over the outer diameter of the piston, and this I do by having as many uncut rings as there are packing-rings, these uncut rings being placed one over the other, each having its outer diameter of such size as to move in the cylinder without binding, and each also having a notch or offset of the size of the spring-ring turned on its outer diameter. The spring-rings are laid in these notches, and the uncut rings, each with a spring-ring in its notch, are placed one over the other. By this means the spring-rings need not be stretched at all, and they can be accurately turned and fitted and placed in position without injury, irrespective of their thickness.

Figure 1:
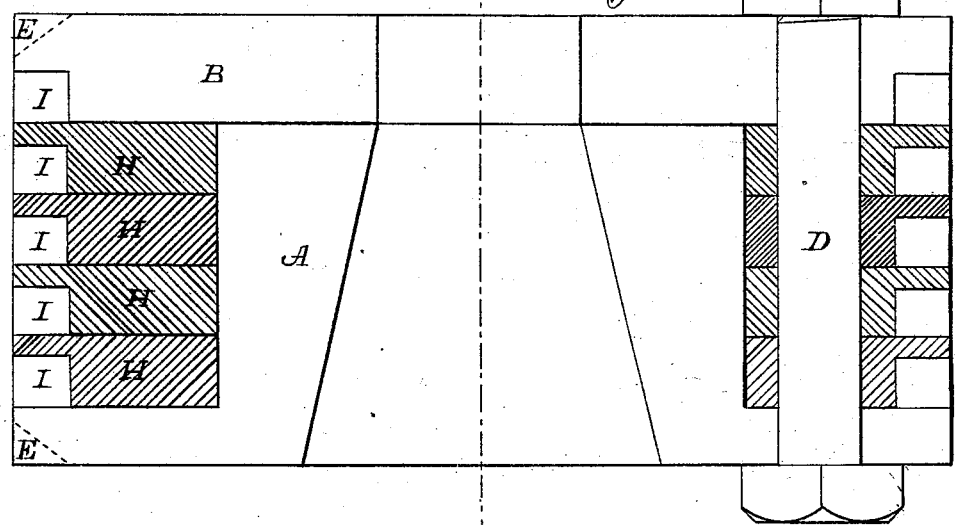

Figure 1 is a sectional full-sized view taken through the center of a small piston, and having five uncut rings and five cut spring packing-rings in the notches of the uncut rings.

A is the piston. B is the follower. H H H are the uncut rings, the upper one forming the follower of the piston. I I I are the spring packing-rings, each the same size as the notch of the uncut ring into which it is placed. D is one of the follower-bolts that keep the uncut rings in position and bind them firmly together. These rings are turned or scraped where they are made to press against each other by the bolts D, so that there can be no leak by the steam passing around them, and so that they may thus form a piston as tight in that respect as a solid piston with grooves turned in it would be, the notches in this piston then corresponding with the grooves of a solid piston.

The uncut ring H can, if desired, be constructed of two rings, each rectangular in section, but of different external diameters.

The spring-rings must fit the notches or grooves accurately, as in Ramsbottom packing, and must not bind and must have liberty to expand against the bore of the cylinder. Any kind of spring-packing can be used; but I prefer cast-iron rings made to spring against the bore of the cylinder by the well-known method of having the packing-ring turned in the first place to a greater diameter than that of the cylinder, and then by having a piece cut out of the ring, which, after being compressed to a smaller diameter than it was originally, but to a diameter a little greater than the bore of the cylinder, is again turned while thus compressed to the exact diameter of the bore, by which means it fits the bore exactly and also springs against it.

If this piston is used as a piston-valve, then the outer edges of the piston and the outside ring should be beveled, as shown by the dotted lines at E E.

Figure 2:
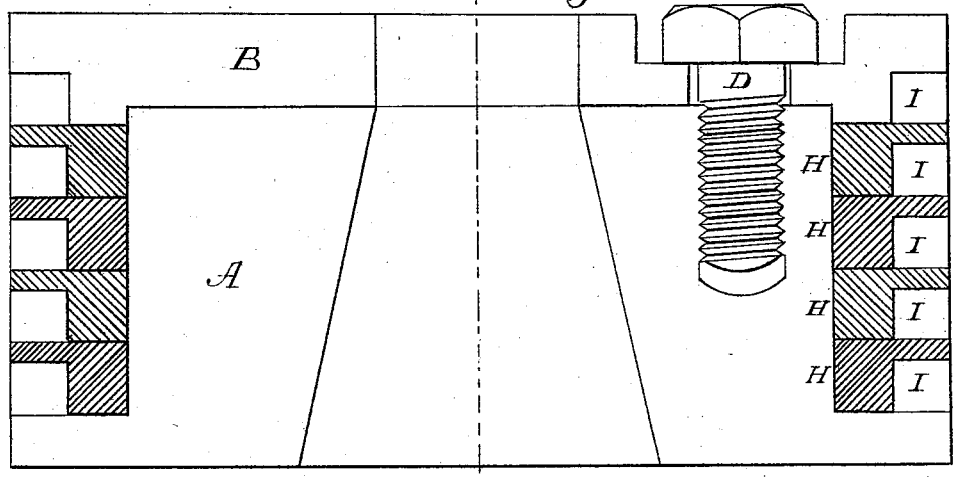

Fig. 2 is the same as Fig. 1, excepting that the bolts D do not pass through the rings, but are placed inside of them.

I am aware that pistons packed by the pressure of steam against the back of the packing-rings have a ring called a "bull-ring," divided by a rib in the center, with a packing-ring on each side of it, so that the pressure of steam may always act against the back of the ring that is on the steam side of the piston.

I claim as my invention—

The piston-packing herein described, consisting of a series of uncut L-shaped rings, H, in combination with spring-rings I, all constructed and arranged substantially as shown and described.

FRANCIS B. STEVENS.

Witnesses:
F. AIGELTINGER,
L. W. BROWN.